(12) United States Patent
Niwa

(10) Patent No.: US 11,198,372 B2
(45) Date of Patent: Dec. 14, 2021

(54) VEHICLE AND STICKING DIAGNOSIS METHOD

(71) Applicant: Toyota Jidosha Kabushiki Kaisha, Toyota (JP)

(72) Inventor: Yamato Niwa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/781,244

(22) Filed: Feb. 4, 2020

(65) Prior Publication Data

US 2020/0247256 A1 Aug. 6, 2020

(30) Foreign Application Priority Data

Feb. 6, 2019 (JP) .............................. JP2019-019966

(51) Int. Cl.
*B60L 53/16* (2019.01)
*B60L 53/18* (2019.01)

(52) U.S. Cl.
CPC .............. *B60L 53/16* (2019.02); *B60L 53/18* (2019.02)

(58) Field of Classification Search
CPC ................................. B60L 53/16; B60L 53/18
USPC ........................................................ 320/109
See application file for complete search history.

(56) References Cited

U.S. PATENT DOCUMENTS

| | | | | |
|---|---|---|---|---|
| 10,516,189 B2 * | 12/2019 | Loftus | .................... | H01M 10/48 |
| 10,962,583 B2 * | 3/2021 | Lehnhardt | ............ | H02H 7/1213 |
| 2011/0121780 A1 * | 5/2011 | Fukuo | ..................... | B60L 53/14 |
| | | | | 320/109 |
| 2011/0279082 A1 * | 11/2011 | Hagenmaier, Jr. | ...... | B60L 53/62 |
| | | | | 320/109 |
| 2013/0106423 A1 * | 5/2013 | Moon | ................... | B60L 3/0023 |
| | | | | 324/418 |
| 2014/0333311 A1 * | 11/2014 | Liu | ..................... | G01R 19/0038 |
| | | | | 324/418 |
| 2015/0115966 A1 * | 4/2015 | Berman | .................. | B60L 53/16 |
| | | | | 324/418 |
| 2016/0236633 A1 * | 8/2016 | Mori | ...................... | B60L 1/006 |
| 2016/0243954 A1 * | 8/2016 | Moro | .................. | B60L 15/2009 |
| 2017/0015200 A1 * | 1/2017 | Hatanaka | ................ | B60L 53/16 |
| 2017/0267102 A1 * | 9/2017 | Hori | ..................... | B60W 20/50 |
| 2018/0294660 A1 * | 10/2018 | Byun | .................... | B60L 3/0046 |
| 2019/0128943 A1 * | 5/2019 | Kawamura | ............ | G01R 31/52 |

(Continued)

FOREIGN PATENT DOCUMENTS

| FR | 3092434 | * | 2/2019 |
|---|---|---|---|
| JP | 2016-119762 A | | 6/2016 |
| JP | 2018-038138 A | | 3/2018 |

*Primary Examiner* — Suresh Memula
(74) *Attorney, Agent, or Firm* — Dinsmore & Shohl LLP

(57) ABSTRACT

An ECU of a vehicle performs processing for diagnosing sticking of a charge relay with an SMR being open. The sticking diagnosis processing is performed while electric power is being supplied from a DC power feed facility to the vehicle. The sticking diagnosis processing includes both-element sticking diagnosis processing and one-element sticking diagnosis processing. The ECU performs both-element sticking diagnosis processing by outputting an output command to the DC power feed facility. When it is determined that both of the charge relays have not stuck in the both-element sticking diagnosis processing, the ECU performs one-element sticking diagnosis processing and diagnoses whether or not sticking has occurred in each of the charge relays.

11 Claims, 9 Drawing Sheets

(56) References Cited

U.S. PATENT DOCUMENTS

| | | | |
|---|---|---|---|
| 2019/0225109 A1* | 7/2019 | Ono | B60L 3/0092 |
| 2019/0229541 A1* | 7/2019 | Ono | B60L 58/19 |
| 2020/0134944 A1* | 4/2020 | Yumoto | B60L 3/04 |
| 2020/0185175 A1* | 6/2020 | Nakayama | H01H 47/005 |
| 2020/0247242 A1* | 8/2020 | Kojima | B60L 50/51 |
| 2020/0247256 A1* | 8/2020 | Niwa | B60L 53/16 |
| 2020/0276908 A1* | 9/2020 | Lim | B60L 53/66 |
| 2020/0313581 A1* | 10/2020 | Chon | B60L 50/16 |
| 2021/0053454 A1* | 2/2021 | Morich | B60L 3/0069 |

\* cited by examiner

VEHICLE AND STICKING DIAGNOSIS METHOD

CROSS REFERENCE TO RELATED APPLICATIONS

This nonprovisional application claims priority to Japanese Patent Application No. 2019-019966 filed with the Japan Patent Office on Feb. 6, 2019, the entire contents of which are hereby incorporated by reference.

BACKGROUND

Field

The present disclosure relates to a vehicle in which an incorporated power storage is chargeable by receiving electric power supplied from a power feed facility outside the vehicle and a method of diagnosing sticking of a charge relay included in the vehicle.

Description of the Background Art

Japanese Patent Laying-Open No. 2018-38138 discloses a vehicle capable of direct-current (DC) charging in which an incorporated power storage is chargeable by receiving DC power supplied from a power feed facility outside the vehicle. This vehicle includes a charge port for connection of a connector of the power feed facility, a voltage sensor that detects a voltage applied to the charge port, a charge relay electrically connected between the charge port and a power storage, and a controller that diagnoses whether or not the charge relay has stuck.

In this vehicle, after DC charging is completed, the controller diagnoses whether or not the charge relay has stuck. In diagnosis of sticking of the charge relay, for example, the controller outputs a command to open the charge relay while it ensures a state that no electric power is being output from the power feed facility by transmitting a stop command requesting stop of output of electric power to the power feed facility. Then, the controller diagnoses whether or not the charge relay has stuck based on whether or not the voltage sensor detects a voltage of the power storage. When the voltage sensor detects a voltage of the power storage, it is determined that the charge relay has stuck in a closed state. The power feed facility that supplies DC power is also referred to as a "DC power feed facility" below.

SUMMARY

For example, when a DC power feed facility in conformity with a prescribed charging standard such as the CHAdeMO (trademark) standard, the combined charging system (CCS) standard, and the GB/T standard receives an output command requesting output of electric power from a vehicle, the power feed facility supplies electric power in accordance with the output command to the vehicle. When the DC power feed facility in conformity with the prescribed charging standard receives a stop command requesting stop of output of electric power from the vehicle, the power feed facility stops supply of electric power to the vehicle in accordance with the stop command. Namely, the DC power feed facility in conformity with the prescribed charging standard can control output/stop of electric power from a vehicle side. Japanese Patent Laying-Open No. 2018-38138 seems to be premised on use of the DC power feed facility in conformity with a prescribed charging standard.

Among current DC power feed facilities, there is a DC power feed facility (which is also referred to as a "specific DC power feed facility" below) that is not in conformity with a prescribed charging standard and does not stop, even when the DC power feed facility receives a stop command from the vehicle, supply of electric power without obeying the stop command.

In diagnosis of sticking of a charge relay in the vehicle disclosed in Japanese Patent Laying-Open No. 2018-38138, when the DC power feed facility connected to the charge port of the vehicle falls under the specific DC power feed facility, a voltage may be applied to the charge port from the specific DC power feed facility even though the vehicle is transmitting a stop command. Therefore, even when the charge relay is normally open in accordance with an open command, the voltage sensor may detect a voltage. Consequently, in spite of the charge relay not having stuck, erroneous diagnosis that the charge relay has stuck in a closed state may be made.

The present disclosure was made to solve the problem above, and an object thereof is to suppress erroneous diagnosis of sticking of a charge relay due to the fact that a DC power feed facility falls under a specific DC power feed facility.

A vehicle according to the present disclosure includes a power storage chargeable by receiving electric power supplied through a charge cable from a power feed facility outside the vehicle, a first power line and a second power line, a first relay electrically connected between a positive electrode of the power storage and the first power line, a second relay electrically connected between a negative electrode of the power storage and the second power line, a charge port to which a connector provided in the charge cable can be connected, a first charge relay electrically connected between the first power line and the charge port, a second charge relay electrically connected between the second power line and the charge port, a communication apparatus that transmits a command to the power feed facility, and a controller that performs sticking diagnosis processing for diagnosing whether or not the first charge relay and/or the second charge relay have/has stuck with the connector and the charge port being connected to each other. In the sticking diagnosis processing, the controller outputs an open or close command to each of the first charge relay and the second charge relay, transmits an output command requesting output of electric power to the power feed facility through the communication apparatus, and makes determination as to sticking of the first charge relay and/or the second charge relay based on whether or not electric power is being supplied from the power feed facility to the first power line and the second power line.

A sticking diagnosis method according to the present disclosure is a method of diagnosing sticking of a charge relay of a vehicle in which a power storage mounted on the vehicle is chargeable by receiving electric power supplied through a charge cable from a power feed facility outside the vehicle. The vehicle includes a first power line, a second power line, a first relay electrically connected between a positive electrode of the power storage and the first power line, a second relay electrically connected between a negative electrode of the power storage and the second power line, a charge port to which a connector provided in the charge cable can be connected, a first charge relay electrically connected between the first power line and the charge port, a second charge relay electrically connected between the second power line and the charge port, and a communication apparatus that transmits a command to the power feed facility. The method, with the connector and the charge port being connected to each other, includes outputting an open or close command to each of the first charge relay and the second charge relay, transmitting an output command requesting output of electric power to the power feed facility through the communication apparatus, and making determination as to sticking of the first charge relay and/or the second charge relay based on whether or not electric power is being supplied from the power feed facility to the first power line and the second power line.

According to the configuration and the method, sticking of a charge relay is diagnosed while electric power is being supplied from the power feed facility to the vehicle by transmission of an output command to the power feed facility. Therefore, even though the power feed facility falls under a specific DC power feed facility and electric power is unintentionally supplied from the power feed facility to the vehicle at the time of diagnosis of sticking of a charge relay, diagnosis is made on the premise that electric power is supplied from the power feed facility to the vehicle. Therefore, whether or not sticking has occurred can appropriately be diagnosed without influence on diagnosis of sticking of the charge relay. According to the configuration and the method, regardless of whether or not the power feed facility falls under the specific DC power feed facility, whether or not a charge relay has stuck can appropriately be diagnosed.

In one embodiment, the sticking diagnosis processing is performed after charging of the power storage is completed.

The sticking diagnosis processing is performed after charging is completed so that it is ensured that the charge relay has not stuck in a closed state after charging.

In one embodiment, the vehicle further includes a voltage sensor that detects a voltage between the first power line and the second power line. The controller performs the sticking diagnosis processing with the first relay and the second relay being open. In the sticking diagnosis processing, the controller outputs the open or close command to each of the first charge relay and the second charge relay and transmits the output command to the power feed facility through the communication apparatus. The controller then makes determination as to sticking of the first charge relay and the second charge relay based on the voltage detected by the voltage sensor.

According to the configuration, sticking of the charge relay is diagnosed with the first relay and the second relay being open while a voltage is being applied by the power feed facility to the charge port by transmission of an output command to the power feed facility. For diagnosis of sticking of the charge relay, a voltage sensor that detects not a voltage applied to the charge port but a voltage between the first power line and the second power line is used. For example, when both of the charge relays are closed while electric power is being supplied from the power feed facility, the voltage sensor detects a voltage applied by the power feed facility to the charge port. When at least one of the charge relays is opened while electric power is being supplied from the power feed facility, the voltage sensor does not detect the voltage applied by the power feed facility to the charge port. In other words, by using an open or close command to the charge relay and a voltage detected by the voltage sensor while the voltage is being applied by the power feed facility to the vehicle, whether or not a charge relay has stuck can be diagnosed. By setting a state that a voltage is being applied by the power feed facility to the vehicle as the premise for sticking diagnosis processing, even though the power feed facility falls under a specific DC power feed facility and a voltage is unintentionally applied by the power feed facility to the charge port at the time of diagnosis of sticking of a charge relay, whether or not the charge relay has stuck can appropriately be diagnosed based on an open or close command to the charge relay and a voltage detected by the voltage sensor. According to the configuration and the method, regardless of whether or not the power feed facility falls under the specific DC power feed facility, whether or not the charge relay has stuck can appropriately be diagnosed.

In one embodiment, the sticking diagnosis processing includes both-element sticking diagnosis processing for diagnosing whether or not both of the first charge relay and the second charge relay have stuck. In the both-element sticking diagnosis processing, the controller outputs a command to open both of the first charge relay and the second charge relay and transmits the output command to the power feed facility through the communication apparatus. Then, when the voltage detected by the voltage sensor is higher than a first threshold voltage, the controller determines that both of the first charge relay and the second charge relay have stuck in a closed state.

In one embodiment, when the voltage detected by the voltage sensor is lower than the first threshold voltage in the both-element sticking diagnosis processing, the controller determines that at least one of the first charge relay and the second charge relay has not stuck in the closed state.

In both-element sticking diagnosis processing, when both of the first charge relay and the second charge relay are closed, the voltage sensor detects a voltage applied by the power feed facility (a voltage higher than the first threshold voltage). In the both-element sticking diagnosis processing, when at least one of the first charge relay and the second charge relay is open, the voltage sensor does not detect a voltage applied by the power feed facility (detects a voltage lower than the first threshold voltage).

In both-element sticking diagnosis processing, when the voltage detected by the voltage sensor is higher than the first threshold voltage in spite of transmission of an open command to both of the first charge relay and the second charge relay, both of the first charge relay and the second charge relay can be determined as having stuck in the closed state. In both-element sticking diagnosis processing, when an open command is transmitted to both of the first charge relay and the second charge relay and the voltage detected by the voltage sensor is lower than the first threshold voltage, at least one of the first charge relay and the second charge relay can be determined as being open and as not having stuck in the closed state. In other words, it can be determined that (1) neither of the first charge relay and the second charge relay is stuck in the closed state or (2) one of the first charge relay and the second charge relay is not stuck in the closed state.

In one embodiment, the sticking diagnosis processing includes one-element sticking diagnosis processing for diagnosing whether or not one of the first charge relay and the second charge relay has stuck. In the one-element sticking diagnosis processing, the controller outputs a command to open the one of the first charge relay and the second charge relay and to close the other of them and transmits the output command to the power feed facility through the communication apparatus. The, when the voltage detected by the voltage sensor is higher than a second threshold voltage, the controller determines that the one of the first charge relay and the second charge relay has stuck in a closed state.

When at least one of the first charge relay and the second charge relay is open in one-element sticking diagnosis processing, the voltage sensor does not detect a voltage applied by the power feed facility (detects a voltage lower than the second threshold voltage). In one-element sticking diagnosis processing, when the voltage detected by the voltage sensor is higher than the second threshold voltage in spite of transmission of a command to open one charge relay and to close the other charge relay, one charge relay can be determined as having stuck in the closed state. Whether or not each of the first charge relay and the second charge relay has stuck in the closed state can appropriately be determined by performing one-element sticking diagnosis processing.

In one embodiment, the vehicle further includes a current sensor that detects a current input to and output from the power storage. The controller performs the sticking diagnosis processing with the first relay and the second relay being closed. In the sticking diagnosis processing, the controller outputs the open or close command to each of the first charge relay and the second charge relay and transmits the output command to the power feed facility through the communication apparatus. The controller then makes determination as to sticking of the first charge relay and the second charge relay based on the current detected by the current sensor.

According to the configuration, sticking diagnosis processing is performed with the first relay and the second relay being closed while electric power is being supplied from the power feed facility by transmission of an output command to the power feed facility. For example, when both of the charge relays are closed while electric power is being supplied from the power feed facility, the current sensor detects a current supplied from the power feed facility to the power storage. When at least one of the charge relays is opened while electric power is being supplied from the power feed facility, the current sensor does not detect a current supplied from the power feed facility to the power storage. In other words, by using an open or close command to the charge relay and a current detected by the current sensor while electric power is being supplied from the power feed facility to the vehicle, whether or not a charge relay has stuck can be diagnosed. By setting a state that electric power is being supplied from the power feed facility to the vehicle as the premise for sticking diagnosis processing, even though the power feed facility falls under a specific DC power feed facility and electric power is unintentionally supplied from the power feed facility at the time of diagnosis of sticking of a charge relay, whether or not the charge relay has stuck can appropriately be diagnosed based on an open or close command to the charge relay and a current detected by the current sensor. According to the configuration, regardless of whether or not the power feed facility falls under the specific DC power feed facility, whether or not the charge relay has stuck can appropriately be diagnosed.

In one embodiment, the sticking diagnosis processing includes both-element sticking diagnosis processing for diagnosing whether or not both of the first charge relay and the second charge relay have stuck. In the both-element sticking diagnosis processing, the controller outputs a command to open both of the first charge relay and the second charge relay and transmits the output command to the power feed facility through the communication apparatus. Then, when the current detected by the current sensor is higher than a first threshold current, the controller determines that both of the first charge relay and the second charge relay have stuck in a closed state.

In one embodiment, when the current detected by the current sensor is lower than the first threshold current in the both-element sticking diagnosis processing, the controller determines that at least one of the first charge relay and the second charge relay has not stuck in the closed state.

In both-element sticking diagnosis processing, when both of the first charge relay and the second charge relay are closed, the current sensor detects a current supplied from the power feed facility to the power storage (a current higher than the first threshold current). When at least one of the first charge relay and the second charge relay is open in the both-element sticking diagnosis processing, the current sensor does not detect a current supplied from the power feed facility to the power storage (detects a current lower than the first threshold current).

In the both-element sticking diagnosis processing, when the current detected by the current sensor is higher than the first threshold current in spite of transmission of an open command to both of the first charge relay and the second charge relay, both of the first charge relay and the second charge relay can be determined as having stuck in the closed state. In both-element sticking diagnosis processing, when an open command is transmitted to both of the first charge relay and the second charge relay and the current detected by the current sensor is lower than the first threshold current, at least one of the first charge relay and the second charge relay can be determined as being open and as not having stuck in the closed state. In other words, it can be determined that (1) neither of the first charge relay and the second charge relay is stuck in the closed state or (2) one of the first charge relay and the second charge relay is not stuck in the closed state.

In one embodiment, the sticking diagnosis processing includes one-element sticking diagnosis processing for diagnosing whether or not one of the first charge relay and the second charge relay has stuck. In the one-element sticking diagnosis processing, the controller outputs a command to open the one of the first charge relay and the second charge relay and to close the other of them and transmits the output command to the power feed facility through the communication apparatus. Then, when the current detected by the current sensor is higher than a second threshold current, the controller determines that the one of the first charge relay and the second charge relay has stuck in a closed state.

When at least one of the first charge relay and the second charge relay is open in one-element sticking diagnosis processing, the current sensor does not detect a current supplied from the power feed facility to the power storage (detects a current lower than the second threshold current). In one-element sticking diagnosis processing, when the current detected by the current sensor is higher than the second threshold current in spite of transmission of a command to open one charge relay and to close the other charge relay, one charge relay can be determined as having stuck in the closed state. Whether or not each of the first charge relay and the second charge relay has stuck in the closed state can appropriately be determined by performing one-element sticking diagnosis processing.

The foregoing and other objects, features, aspects and advantages of the present disclosure will become more apparent from the following detailed description of the present disclosure when taken in conjunction with the accompanying drawings.

DETAILED DESCRIPTION

Figure 1:
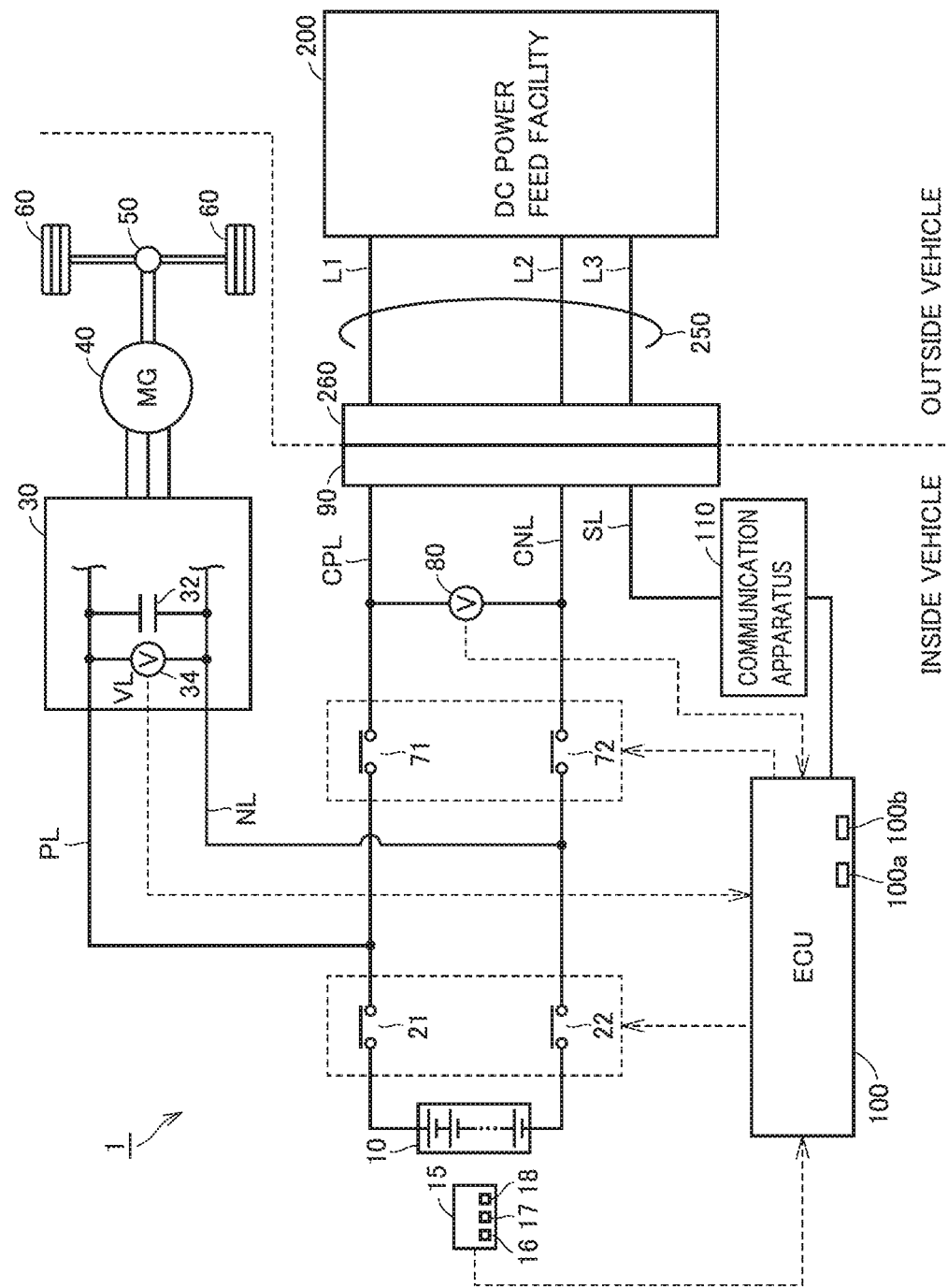
FIG. 1 is a block diagram showing an exemplary configuration of a charging system including a vehicle according to a first embodiment.

An embodiment of the present disclosure will be described below in detail with reference to the drawings. The same or corresponding elements in the drawings have the same reference characters allotted and description thereof will not be repeated.

First Embodiment

<Overall Configuration>

FIG. 1 is a block diagram showing an exemplary configuration of a charging system including a vehicle according to a first embodiment. Referring to FIG. 1, the charging system includes a vehicle 1, a DC power feed facility 200, and a charge cable 250. Though an example in which vehicle 1 according to the present embodiment is an electric vehicle is described, vehicle 1 may be capable of DC charging in which an incorporated power storage is charged by receiving DC power supplied from DC power feed facility 200, and it is not limited to an electric vehicle. For example, vehicle 1 may be a plug-in hybrid vehicle or a fuel cell vehicle.

DC power feed facility 200 is a facility for supplying DC power to vehicle 1 through charge cable 250. In DC charging, a connector 260 provided at a tip end of charge cable 250 is connected to a charge port (which will be described later) of vehicle 1.

Referring to FIG. 1, vehicle 1 includes a power storage 10, a monitoring unit 15, system main relays (which are each also referred to as an "SMR" below) 21 and 22, a power control unit (which is also referred to as a "PCU" below) 30, a motor generator (which is also referred to as an "MG" below) 40, a power transmission gear 50, a drive wheel 60, and an electronic control unit (ECU) 100. Vehicle 1 includes charge relays 71 and 72, a voltage sensor 80, a charge port 90, and a communication apparatus 110.

Power storage 10 is incorporated in vehicle 1 as a driving power supply (that is, a motive power source) of vehicle 1. Power storage 10 includes a plurality of stacked batteries. Examples of the battery include secondary batteries such as a nickel metal hydride battery and a lithium ion battery. The battery may be a battery containing a liquid electrolyte between a positive electrode and a negative electrode or a battery containing a solid electrolyte (an all-solid-state battery). Power storage 10 may be a rechargeable DC power supply and a large-capacity capacitor can also be adopted.

Monitoring unit 15 monitors a state of power storage 10. Specifically, monitoring unit 15 includes a voltage sensor 16, a current sensor 17, and a temperature sensor 18. Voltage sensor 16 detects a voltage of power storage 10. Current sensor 17 detects a current IB input to and output from power storage 10. Temperature sensor 18 detects a temperature of power storage 10. Each sensor outputs a result of detection thereby to ECU 100.

SMRs 21 and 22 are electrically connected between power storage 10 and power lines PL and NL. Specifically, SMR 21 has one end electrically connected to a positive electrode terminal of power storage 10 and has the other end electrically connected to power line PL. SMR 22 has one end electrically connected to a negative electrode terminal of power storage 10 and has the other end electrically connected to power line NL. Open/closed states of SMRs 21 and 22 are controlled by a control signal from ECU 100.

SMR 21 according to the first embodiment corresponds to one example of the "first relay" according to the present disclosure. SMR 22 according to the first embodiment corresponds to one example of the "second relay" according to the present disclosure. Power line PL according to the first embodiment corresponds to one example of the "first power line." Power line NL according to the first embodiment corresponds to one example of the "second power line."

PCU 30 is a collective denotation of a power conversion device for driving MG 40 by receiving electric power from power storage 10. PCU 30 is electrically connected to power lines PL and NL and controlled by ECU 100. PCU 30 includes, for example, an inverter that drives MG 40 or a converter that boosts electric power output from power storage 10 and supplies boosted electric power to the inverter.

PCU 30 includes a capacitor 32 and a voltage sensor 34. Capacitor 32 is connected between power lines PL and NL and smoothens a voltage VL between power lines PL and NL. Power line PL is electrically connected to the positive electrode terminal of power storage 10 with SMR 21 being interposed. Power line NL is electrically connected to the negative electrode terminal of power storage 10 with SMR 22 being interposed. Voltage sensor 34 detects a voltage across opposing ends of capacitor 32, that is, voltage VL between power lines PL and NL.

MG 40 is an alternating-current (AC) rotating electric machine and it is, for example, a permanent magnet synchronous motor including a rotor having a permanent magnet embedded. The rotor of MG 40 is mechanically connected to drive wheel 60 with power transmission gear 50 being interposed. MG 40 generates kinetic energy for running vehicle 1 by receiving AC power from PCU 30. Kinetic energy generated by MG 40 is transmitted to power transmission gear 50. When vehicle 1 is decelerated or stopped, MG 40 converts kinetic energy of vehicle 1 into electric energy. AC power generated by MG 40 is converted to DC power by PCU 30 and DC power is supplied to power storage 10. Regenerated power can thus be stored in power storage 10. MG 40 thus generates driving force or braking force of vehicle 1, with supply and reception of electric power to and from power storage 10 (that is, charging and discharging of power storage 100).

When vehicle 1 is a plug-in hybrid vehicle further including an engine (not shown) as a motive power source, engine output in addition to output from MG 40 can be used as driving force for running. Alternatively, a motor generator (not shown) that generates electric power by using engine output can also further be incorporated to generate charging power for power storage 10 with engine output.

Charge relays 71 and 72 are electrically connected between power lines PL and NL and charge port 90. Specifically, charge relay 71 has one end electrically connected to power line PL and the other end electrically connected to charge port 90 with a power line CPL being interposed. Charge relay 72 has one end electrically connected to power line NL and the other end electrically connected to charge port 90 with a power line CNL being interposed. Open/closed states of charge relays 71 and 72 are controlled by a control signal from ECU 100.

Charge port 90 is configured such that connector 260 provided at the tip end of charge cable 250 of DC power feed facility 200 can be connected thereto. Charge cable 250 includes power lines L1 and L2 and a communication signal line L3. When connector 260 is connected to charge port 90, power lines L1 and L2 and communication signal line L3 of DC power feed facility 200 are connected to power lines CPL and CNL and a communication signal line SL of vehicle 1, respectively.

Voltage sensor 80 detects a potential difference between power lines CPL and CNL. Voltage sensor 80 detects a voltage applied to charge port 90 by DC power feed facility 200. Voltage sensor 80 outputs a result of detection to ECU 100.

Communication apparatus 110 can communicate with DC power feed facility 200 through communication signal line SL. Communication between vehicle 1 and DC power feed facility 200 is, for example, communication in conformity with a controller area network (CAN) communication protocol (which is also referred to as "CAN communication" below). Communication between vehicle 1 and DC power feed facility 200 is not limited to CAN communication and may be power line communication (PLC) or wireless communication.

ECU 100 includes a central processing unit (CPU) 100a, a memory 100b, and an input and output buffer (not shown), receives input of signals from various sensors and outputs a control signal to each device, and controls each device. Control is not limited to processing by software and control based on construction of dedicated hardware (electronic circuits) and processing thereby are also applicable.

ECU 100 can calculate a state of charge (SOC) of power storage 10. Various known approaches by using a voltage of power storage 10 detected by monitoring unit 15 and current IB input to and output from power storage 10 can be adopted as a method of calculating an SOC of power storage 10.

ECU 100 outputs a calculated SOC of power storage 10 or a voltage of power storage 10 to DC power feed facility 200 through communication apparatus 110. ECU 100 transmits various commands such as an output command requesting DC power feed facility 200 to output electric power, a stop command requesting the DC power feed facility to stop output of electric power, and a charging current command value through communication apparatus 110.

ECU 100 controls open/closed states of SMRs 21 and 22. ECU 100 controls open/closed states of charge relays 71 and 72.

When DC charging is performed, ECU 100 controls all of SMRs 21 and 22 and charge relays 71 and 72 to be closed and transmits an output command to DC power feed facility 200 through communication apparatus 110. While DC charging is being performed, ECU 100 transmits a charging current command value to DC power feed facility 200 through communication apparatus 110 at a prescribed time interval.

DC power feed facility 200 starts supply of electric power to charge port 90 of vehicle 1 in accordance with the output command received from vehicle 1. DC power feed facility 200 outputs a current corresponding to the charging current command value received from vehicle 1.

<Sticking Diagnosis Processing: Both-Element Sticking Diagnosis Processing and One-Element Sticking Diagnosis Processing>

Charge relays 71 and 72 may stick. When charge relay 71 and/or charge relay 72 stick(s), power storage 10 cannot be charged. In particular, when charge relay 71 and/or charge relay 72 stick(s) in the closed state, a voltage of power storage 10 may be applied to charge port 90 at unintended timing.

Therefore, for example, after DC charging is completed, whether or not charge relay 71 and/or charge relay 72 have/has stuck in the closed state may be diagnosed. An approach to diagnosis of sticking includes an approach based on an open/close command to charge relays 71 and 72 and a voltage detected by voltage sensor 80 (a voltage at charge port 90) while electric power is not being supplied from DC power feed facility 200 to vehicle 1 by transmission of a stop command requesting DC power feed facility 200 to stop output of electric power as disclosed, for example, in Japanese Patent Laying-Open No. 2018-38138.

Diagnosis of sticking of charge relays 71 and 72 as above may be premised on the fact that DC power feed facility 200 is in conformity with a prescribed charging standard (for example, the CHAdeMO (trademark) standard, the CCS standard, and the GB/T standard). Output/stop of electric power from DC power feed facility 200 in conformity with the prescribed charging standard can be controlled from a side of vehicle 1. For example, when DC power feed facility 200 in conformity with the prescribed charging standard receives an output command from vehicle 1, it starts supply of electric power in accordance with the output command. When DC power feed facility 200 in conformity with the prescribed charging standard receives a stop command from vehicle 1, it stops supply of electric power to the vehicle in accordance with the stop command.

There is a DC power feed facility (a specific DC power feed facility) among current DC power feed facilities 200, that is not in conformity with the prescribed charging standard and does not stop supply of electric power in spite of reception of a command to stop output from vehicle 1, without obeying the stop command. Therefore, when DC power feed facility 200 falls under the specific DC power feed facility, the approach to diagnosis of sticking described above may not appropriately be able to determine whether or not charge relay 71 and/or charge relay 72 have/has stuck. This is because supply of electric power from DC power feed facility 200 to vehicle 1 may continue in spite of transmission of the stop command to DC power feed facility 200. When supply of electric power from DC power feed facility 200 to vehicle 1 continues, in spite, for example, of charge relay 71 and/or charge relay 72 being appropriately open in accordance with an open command, voltage sensor 80 detects a voltage of electric power from DC power feed facility 200 and hence may erroneously diagnose charge relay 71 and/or charge relay 72 as having stuck in a closed state.

In diagnosis as to whether or not charge relay 71 and/or charge relay 72 have/has stuck that is performed in vehicle 1 according to the first embodiment, while DC power feed facility 200 is supplying electric power to vehicle 1 by transmission of an output command from vehicle 1 to DC power feed facility 200, whether or not sticking has occurred is determined based on an open/close command to charge relays 71 and 72 and a voltage detected by voltage sensor 34 (a voltage between power lines PL and NL). Processing for diagnosing whether or not charge relay 71 and/or charge relay 72 have/has stuck that is performed in vehicle 1 according to the first embodiment is also referred to as "sticking diagnosis processing" below.

By diagnosing whether or not charge relay 71 and/or charge relay 72 have/has stuck while electric power is being supplied from DC power feed facility 200 to vehicle 1, even though DC power feed facility 200 falls under the specific DC power feed facility and electric power is unintentionally supplied from DC power feed facility 200 to vehicle 1 in sticking diagnosis processing, whether or not charge relay 71 and/or charge relay 72 have/has stuck can appropriately be diagnosed. By diagnosing whether or not charge relay 71 and/or charge relay 72 have/has stuck while electric power is being supplied from DC power feed facility 200 to vehicle 1, whether or not charge relay 71 and/or charge relay 72 have/has stuck can appropriately be diagnosed regardless of whether or not DC power feed facility 200 falls under the specific DC power feed facility.

Sticking diagnosis processing according to the first embodiment specifically includes both-element sticking diagnosis processing and one-element sticking diagnosis processing. Both-element sticking diagnosis processing is processing for diagnosing whether or not both of charge relays 71 and 72 have stuck. One-element sticking diagnosis processing is processing for diagnosing whether or not each of charge relays 71 and 72 has stuck. Sticking diagnosis processing will be described in detail below with reference to FIGS. 2, 3, and 4.

Figure 2:
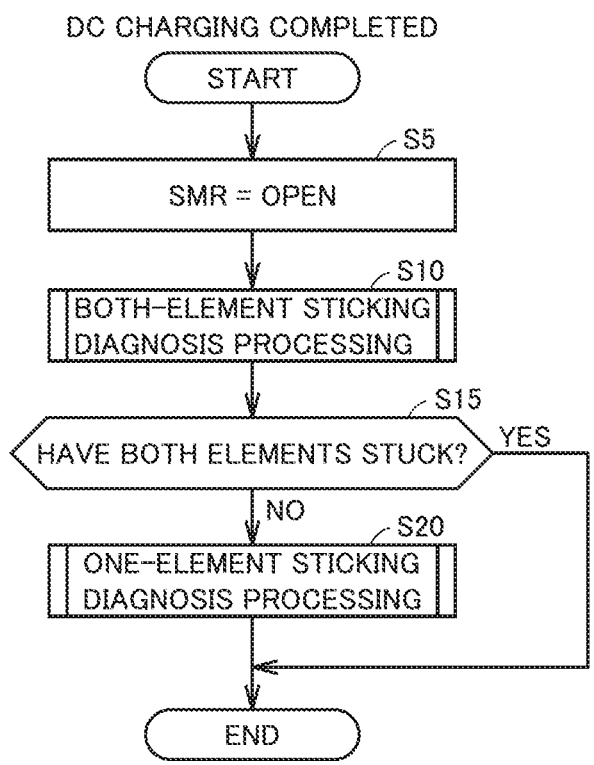
FIG. 2 is a flowchart showing a procedure in sticking diagnosis processing according to the first embodiment.
Figure 3:
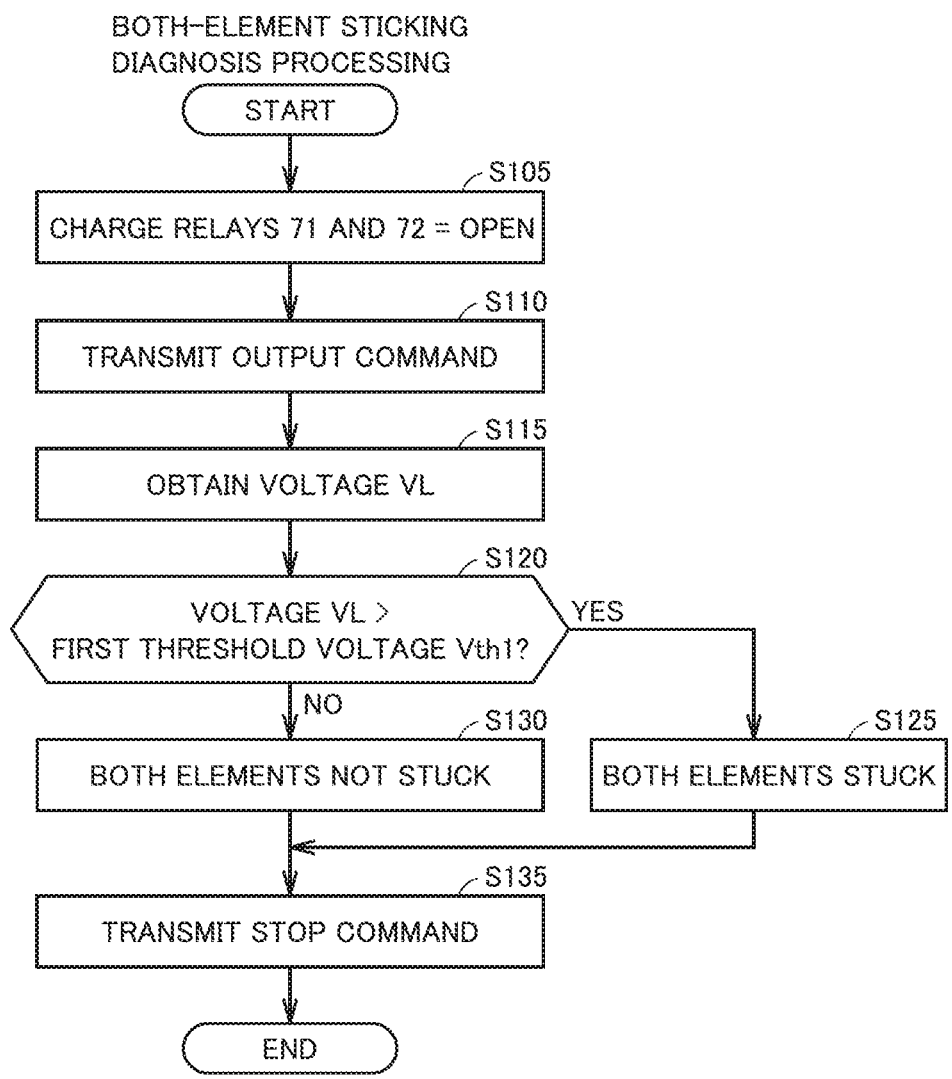
FIG. 3 is a flowchart showing a procedure in both-element sticking diagnosis processing included in the sticking diagnosis processing according to the first embodiment.
Figure 4:
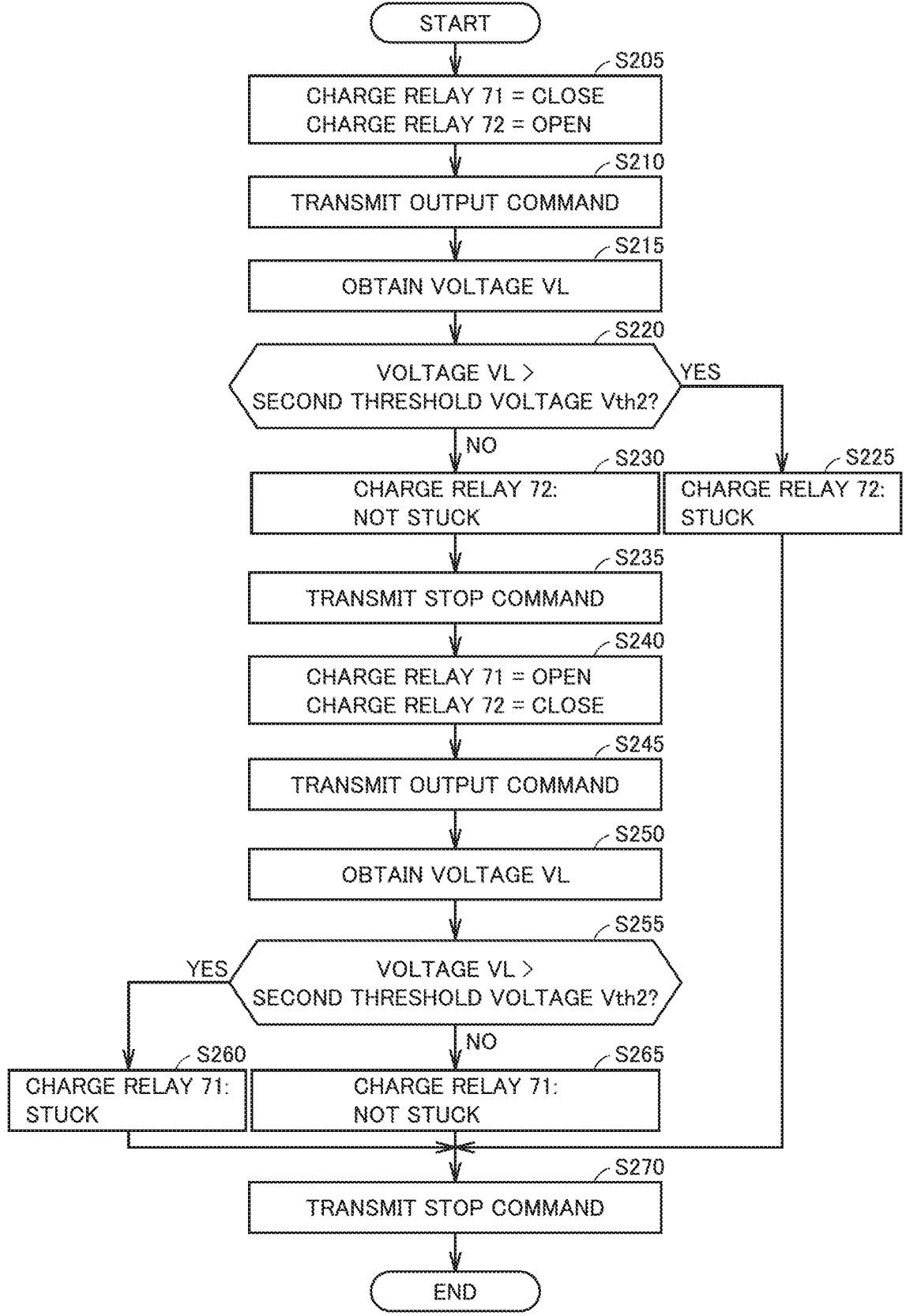
FIG. 4 is a flowchart showing a procedure in one-element sticking diagnosis processing included in the sticking diagnosis processing according to the first embodiment.

FIG. 2 is a flowchart showing a procedure in sticking diagnosis processing according to the first embodiment. This flowchart is performed by ECU 100 of vehicle 1 after DC charging of vehicle 1 is completed. Completion of DC charging in the first embodiment refers to a state that a condition to quit DC charging is satisfied and a stop command has been transmitted from vehicle 1 to power feed facility 200. For example, a condition that an SOC of power storage 10 is equal to or higher than a prescribed level or a condition that a prescribed time period has elapsed since start of DC charging is applicable as the condition for quitting DC charging. FIG. 3 is a flowchart showing a procedure in both-element sticking diagnosis processing included in the sticking diagnosis processing according to the first embodiment. FIG. 4 is a flowchart showing a procedure in one-element sticking diagnosis processing included in the sticking diagnosis processing according to the first embodiment. Though an example in which each step (the step being abbreviated as "S" below) in the flowcharts shown in FIGS. 2 to 4 and FIGS. 5 to 9 which will be described later is performed by software processing by ECU 100 is described, the step may be performed partially or entirely by hardware (electrical circuits) fabricated in ECU 100.

Referring initially to FIGS. 2 and 3, as DC charging of vehicle 1 is completed, ECU 100 outputs a command to open SMRs 21 and 22 to open SMRs 21 and 22 (S5). As SMRs 21 and 22 are opened, control for discharging charges stored in capacitor 32 of PCU 30 is carried out. Under such control, for example, by driving the inverter included in PCU 30, charges stored in capacitor 32 are consumed. Voltage VL detected by voltage sensor 34 is thus lowered, for example, to a voltage around 0 V.

Then, ECU 100 performs both-element sticking diagnosis processing (S10). Referring to FIG. 3, in both-element sticking diagnosis processing, ECU 100 outputs a command to open both of charge relays 71 and 72 (S105).

Then, ECU 100 transmits an output command to DC power feed facility 200 through communication apparatus 110 (S110). DC power feed facility 200 that has received the output command from vehicle 1 starts supply of electric power to vehicle 1 in accordance with the output command. A voltage of electric power supplied from DC power feed facility 200 to charge port 90 is thus applied.

While the voltage is being applied by DC power feed facility 200 to charge port 90, ECU 100 obtains voltage VL detected by voltage sensor 34 (S115) and compares voltage VL with a first threshold voltage Vth1 (S120). First threshold voltage Vth1 is a threshold value for determining whether or not the voltage applied by DC power feed facility 200 to charge port 90 is input to PCU 30 through power lines CPL and CNL, charge relays 71 and 72, and power lines PL and NL in both-element sticking diagnosis processing. First threshold voltage Vth1 is set to a value lower than the lower limit of a voltage that can be applied by DC power feed facility 200 to vehicle 1. First threshold voltage Vth1 is set, for example, to a value approximately from several V to several ten V.

When voltage VL is higher than first threshold voltage Vth1 in S120, that is, when voltage sensor 34 detects a voltage applied by DC power feed facility 200 to charge port 90 in spite of output of an open command to charge relays 71 and 72, it can be concluded that both of charge relays 71 and 72 have stuck in the closed state. Therefore, when voltage VL is higher than first threshold voltage Vth1 in S120 (YES in S120), ECU 100 determines that both of charge relays 71 and 72 have stuck in the closed state (both elements stuck) (S125).

When voltage VL is equal to or lower than first threshold voltage Vth1 in S120 (NO in S120), ECU 100 determines that both of charge relays 71 and 72 have not stuck in the closed state (both elements not stuck), that is, at least one of charge relays 71 and 72 is open in accordance with the open command (S130).

When ECU 100 determines that both of the elements have stuck or have not stuck, it transmits a stop command to DC power feed facility 200 (S135) and quits both-element sticking diagnosis processing.

Referring to FIG. 2, when ECU 100 determines that both of charge relays 71 and 72 have stuck in the closed state (both elements stuck) in both-element sticking diagnosis processing (YES in S15), it quits the process.

When ECU 100 determines that both of charge relays 71 and 72 have not stuck in the closed state (both elements not stuck) in both-element sticking diagnosis processing (NO in S15), it performs one-element sticking diagnosis processing and diagnoses whether or not each of charge relays 71 and 72 has stuck (S20).

Referring to FIG. 4, in one-element sticking diagnosis processing, ECU 100 initially diagnoses whether or not charge relay 72 has stuck. Specifically, ECU 100 outputs a command to close charge relay 71 and to open charge relay 72 (S205).

ECU 100 transmits an output command to DC power feed facility 200 through communication apparatus 110 (S210). DC power feed facility 200 that has received the output command from vehicle 1 starts supply of electric power to vehicle 1 in accordance with the output command.

Then, ECU 100 obtains voltage VL detected by voltage sensor 34 (S215) and compares voltage VL with a second threshold voltage Vth2 (S220). Second threshold voltage Vth2 is a threshold value for determining whether or not a voltage applied by DC power feed facility 200 to charge port 90 is input to PCU 30 through power lines CPL and CNL, charge relays 71 and 72, and power lines PL and NL in one-element sticking diagnosis processing. Second threshold voltage Vth2 is set to a value lower than the lower limit of the voltage that can be applied by DC power feed facility 200 to vehicle 1. Second threshold voltage Vth2 is set to a value, for example, approximately from several V to several ten V. Second threshold voltage Vth2 may be set, for example, to a value the same as first threshold voltage Vth1.

When charge relay 72 is open in accordance with the open command, it is expected that voltage VL detected by voltage sensor 34 attains to a value equal to or lower than second threshold voltage Vth2 in S220. When charge relay 72 has stuck in the closed state, both of charge relays 71 and 72 are closed and hence a voltage from DC power feed facility 200 is input to PCU 30. Therefore, it is expected that voltage VL detected by voltage sensor 34 attains to a value higher than second threshold voltage Vth2.

When voltage VL is higher than second threshold voltage Vth2 (YES in S220), ECU 100 determines that charge relay 72 has stuck in the closed state (S225). Since both of charge relays 71 and 72 have not been determined as having stuck in the closed state in both-element sticking diagnosis processing in this case, it can be concluded that charge relay 71 is normally operating. Therefore, ECU 100 transmits a stop command to DC power feed facility 200 (S270) without diagnosing whether or not charge relay 71 has stuck and quits one-element sticking diagnosis processing.

When voltage VL is equal to or lower than second threshold voltage Vth2 (NO in S220), ECU 100 determines that charge relay 72 has not stuck in the closed state (S230). ECU 100 transmits a stop command to DC power feed facility 200 (S235). Then, ECU 100 determines whether or not charge relay 71 has stuck.

ECU 100 outputs a command to open charge relay 71 and to close charge relay 72 (S240). Then, ECU 100 transmits an output command to DC power feed facility 200 through communication apparatus 110 (S245). DC power feed facility 200 that has received the output command from vehicle 1 starts supply of electric power to vehicle 1 in accordance with the output command.

Then, ECU 100 obtains voltage VL detected by voltage sensor 34 (S250) and compares voltage VL with second threshold voltage Vth2 (S255). When charge relay 71 is open in accordance with the open command in this case, it is expected that voltage VL detected by voltage sensor 34 attains to a value equal to or lower than second threshold voltage Vth2. When charge relay 71 has stuck in the closed state, both of charge relays 71 and 72 are closed and hence a voltage from DC power feed facility 200 is input to PCU 30. Therefore, it is expected that voltage VL detected by voltage sensor 34 attains to a value higher than second threshold voltage Vth2.

When voltage VL is higher than second threshold voltage Vth2 (YES in S255), ECU 100 determines that charge relay 71 has stuck in the closed state (S260).

When voltage VL is equal to or lower than second threshold voltage Vth2 (NO in S255), ECU 100 determines that charge relay 71 has not stuck in the closed state (S265). In this case, neither of charge relays 71 and 72 have stuck and charge relays 71 and 72 are determined as being normal.

When ECU 100 determines whether or not charge relay 71 has stuck in S260 or S265, it transmits a stop command to DC power feed facility 200 (S270) and quits one-element sticking diagnosis processing.

The order of diagnosing charge relays 71 and 72 in one-element sticking diagnosis processing is not particularly limited. Though an example in which whether or not charge relay 72 has stuck is initially diagnosed and thereafter whether or not charge relay 71 has stuck is diagnosed is described above, whether or not charge relay 71 has stuck may be diagnosed and thereafter whether or not charge relay 72 has stuck may be diagnosed.

As set forth above, processing for diagnosing sticking of charge relays 71 and 72 performed by vehicle 1 according to the first embodiment is performed while electric power is being supplied from DC power feed facility 200. In sticking diagnosis processing, vehicle 1 outputs an output command to DC power feed facility 200 and performs sticking diagnosis processing on the premise that a voltage is being applied by DC power feed facility 200 to charge port 90. Therefore, even though DC power feed facility 200 falls under the specific DC power feed facility and electric power is unintentionally supplied from DC power feed facility 200 to vehicle 1 in sticking diagnosis processing, whether or not charge relay 71 and/or charge relay 72 have/has stuck can appropriately be diagnosed. By diagnosing whether or not charge relay 71 and/or charge relay 72 have/has stuck while electric power is being supplied from DC power feed facility 200 to vehicle 1, whether or not charge relay 71 and/or charge relay 72 have/has stuck can appropriately be diagnosed regardless of whether or not DC power feed facility 200 falls under the specific DC power feed facility.

(Modification)

An example in which sticking diagnosis processing includes both-element sticking diagnosis processing and one-element sticking diagnosis processing, both-element sticking diagnosis processing is initially performed, and thereafter one-element sticking diagnosis processing is performed in accordance with a result of performed both-element sticking diagnosis processing has been described in the first embodiment. Sticking diagnosis processing, however, does not have to include both-element sticking diagnosis processing.

Figure 5:
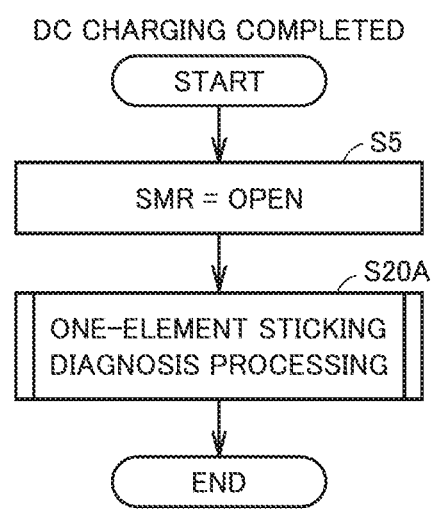
FIG. 5 is a flowchart showing a procedure in sticking diagnosis processing according to a modification.
Figure 6:
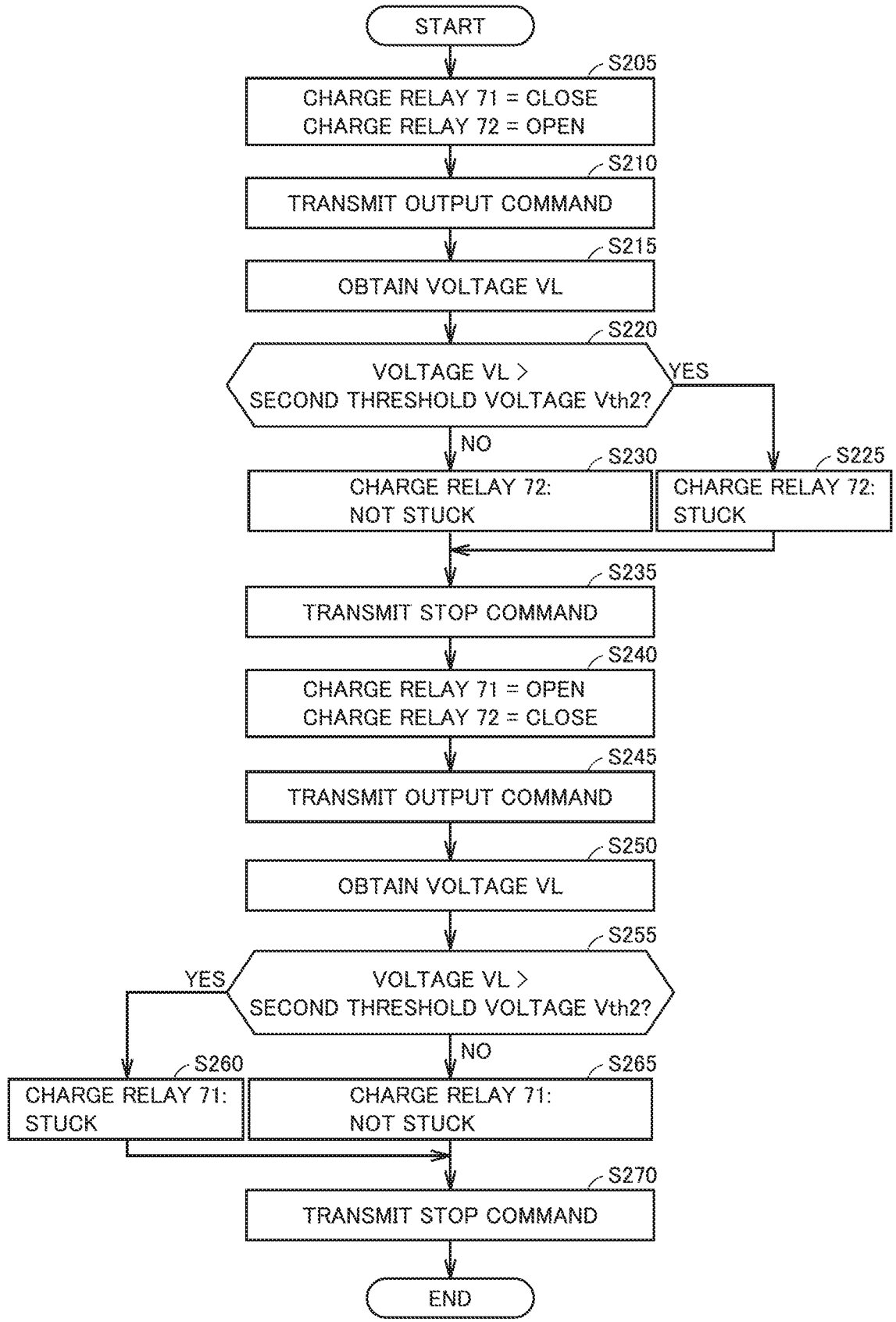
FIG. 6 is a flowchart showing a procedure in one-element sticking diagnosis processing included in the sticking diagnosis processing according to the modification.

FIG. 5 is a flowchart showing a procedure in sticking diagnosis processing according to a modification. This flowchart is performed by ECU 100 of vehicle 1 after completion of DC charging as in the first embodiment. FIG. 6 is a flowchart showing a procedure in one-element sticking diagnosis processing included in the sticking diagnosis processing according to the modification. One-element sticking diagnosis processing shown in FIG. 6 is different from the flowchart shown in FIG. 4 in steps performed after processing in S225. Specifically, the process proceeds to S270 after the processing in S225 in the flowchart shown in FIG. 4, whereas the process proceeds to S235 after the processing in S225 and whether or not charge relay 71 has stuck is diagnosed in the flowchart shown in FIG. 6. In one-element sticking diagnosis processing according to the modification, regardless of a result of diagnosis of sticking of one charge relay (for example, charge relay 72), sticking of the other charge relay (for example, charge relay 71) is also diagnosed. Since processing performed in each step is the same as in the flowchart in FIG. 4, description will not be repeated.

Referring to FIGS. 5 and 6, when DC charging of vehicle 1 is completed, ECU 100 outputs a command to open SMRs 21 and 22 to open SMRs 21 and 22 (S5). Then, ECU 100 performs one-element sticking diagnosis processing (S20A).

As shown in FIG. 6, in one-element sticking diagnosis processing, whether or not each of charge relays 71 and 72 has stuck in the closed state is determined (S225, S230, S260, and S265).

An effect the same as in the first embodiment can be achieved also by performing sticking diagnosis processing according to the modification while output is being provided from DC power feed facility 200.

Second Embodiment

In sticking diagnosis processing according to the first embodiment, whether or not charge relay 71 and/or charge relay 72 have/has stuck is determined based on an open/close command to charge relays 71 and 72 and a voltage detected by voltage sensor 34 (a voltage between power lines PL and NL) while electric power is being supplied from DC power feed facility 200 to vehicle 1 by transmission of an output command from vehicle 1 to DC power feed facility 200. Diagnosis as to whether or not charge relay 71 and/or charge relay 72 have/has stuck, however, is not limited to diagnosis by using voltage sensor 34. For example, whether or not charge relay 71 and/or charge relay 72 have/has stuck may also be diagnosed by using current sensor 17 included in monitoring unit 15, instead of voltage sensor 34.

In sticking diagnosis processing according to a second embodiment, whether or not charge relay 71 and/or charge relay 72 have/has stuck is determined based on an open/close command to charge relays 71 and 72 and a current detected by current sensor 17 (a current input to and output from power storage 10) while electric power is being supplied from DC power feed facility 200 to vehicle 1 by transmission of an output command from vehicle 1 to DC power feed facility 200. Sticking diagnosis processing according to the second embodiment is performed with SMRs 21 and 22 being closed.

Figure 7:
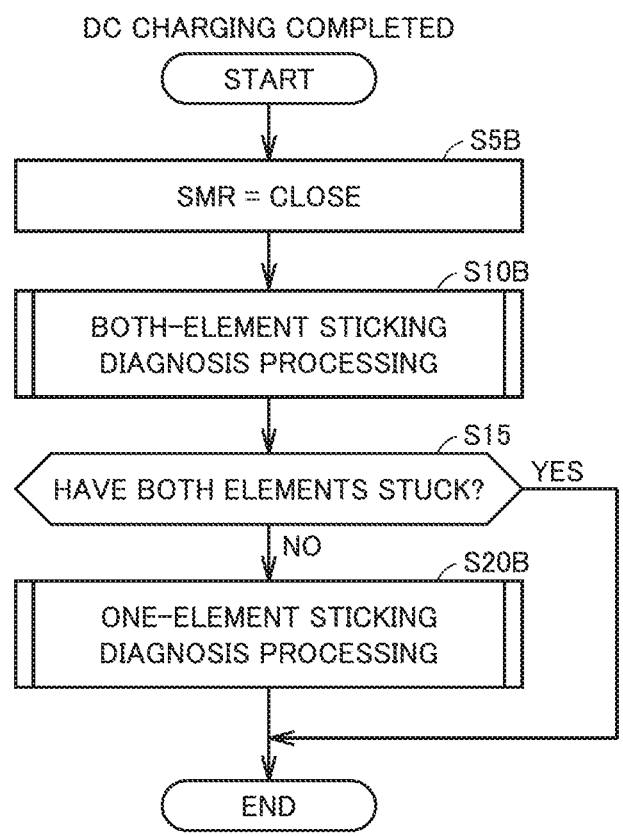
FIG. 7 is a flowchart showing a procedure in sticking diagnosis processing according to a second embodiment.
Figure 8:
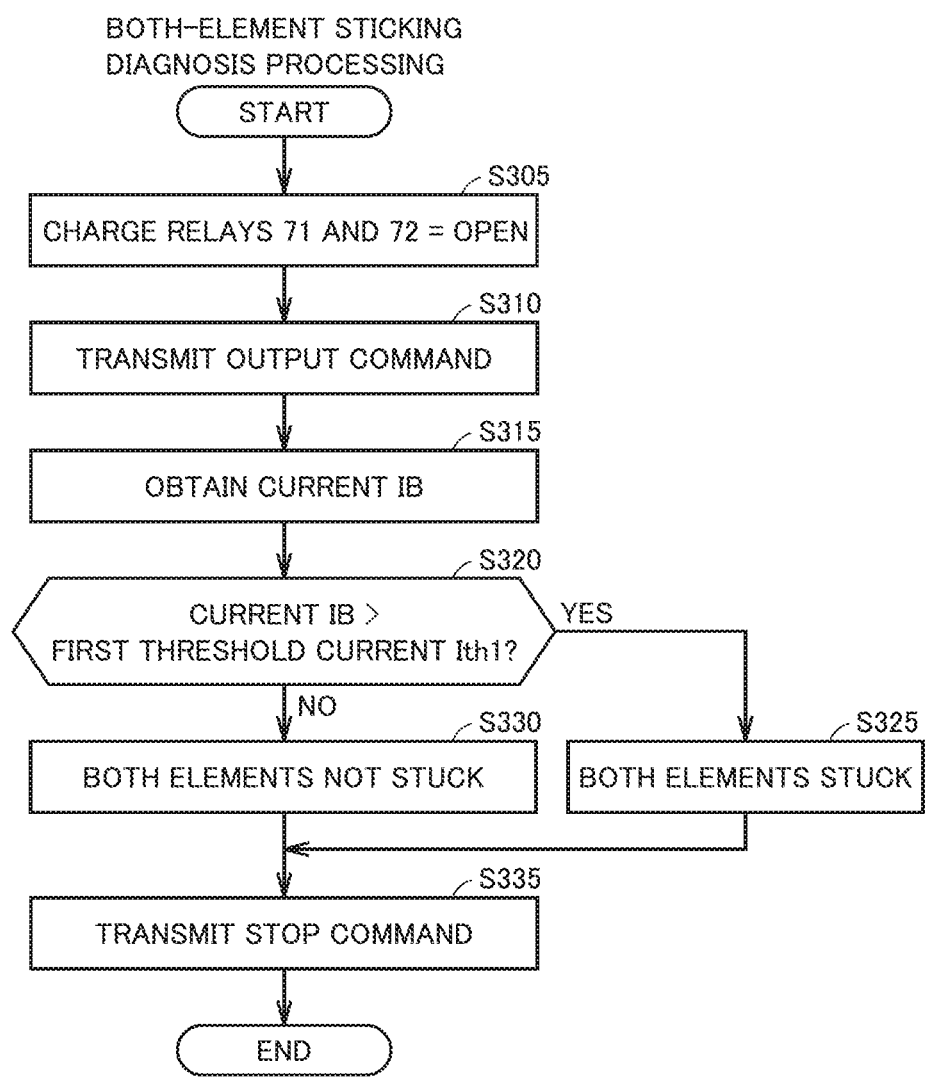
FIG. 8 is a flowchart showing a procedure in both-element sticking diagnosis processing included in the sticking diagnosis processing according to the second embodiment.
Figure 9:
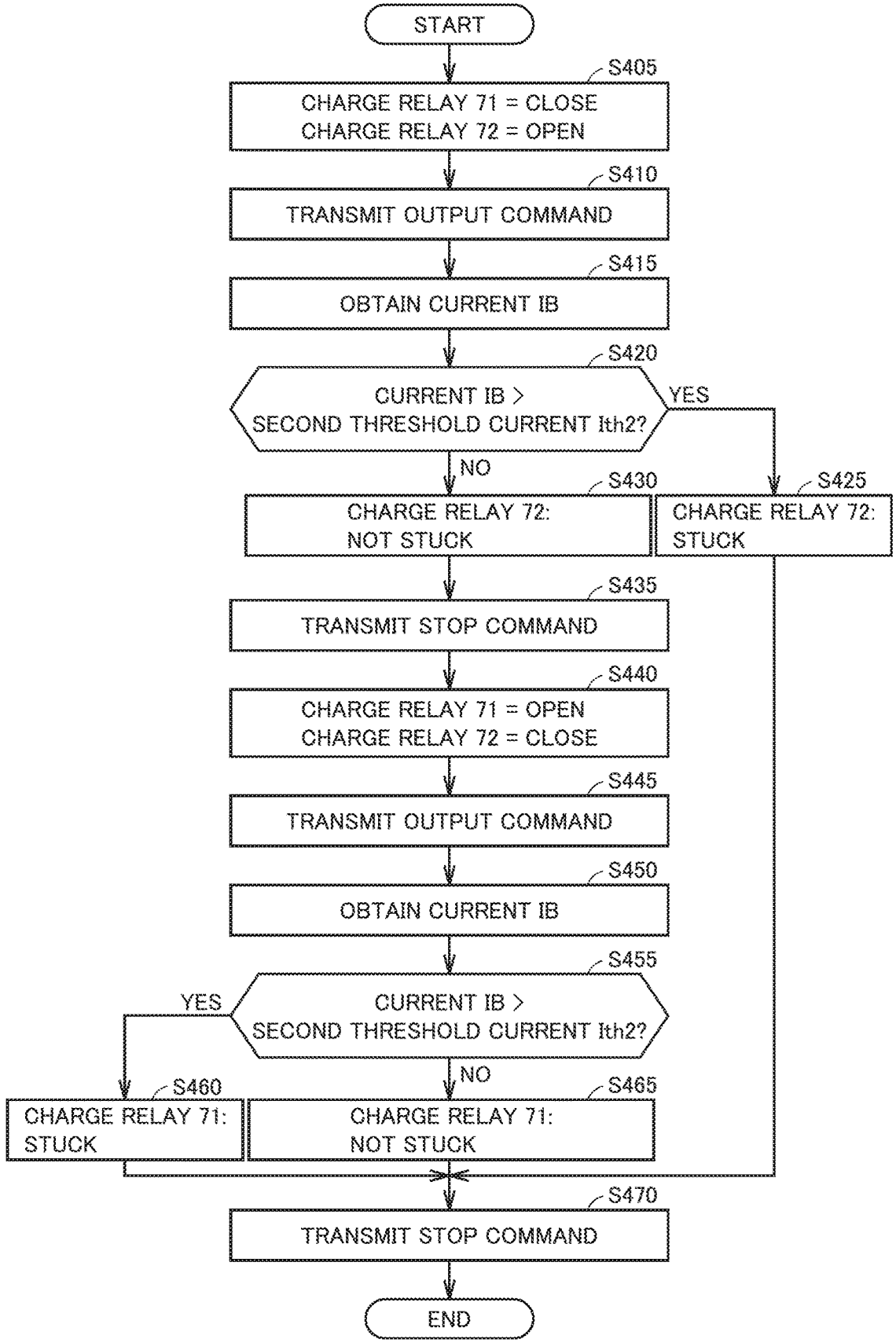
FIG. 9 is a flowchart showing a procedure in one-element sticking diagnosis processing included in the sticking diagnosis processing according to the second embodiment.

FIG. 7 is a flowchart showing a procedure in sticking diagnosis processing according to the second embodiment. The flowchart is performed by ECU 100 of vehicle 1 after completion of DC charging as in the first embodiment. The flowchart in FIG. 7 is a modification to the flowchart in FIG. 2, where S5, S10, and S20 are modified to S5B, S10B, and S20B, respectively. Since another step is the same as in the flowchart in FIG. 2, description will not be repeated. FIG. 8 is a flowchart showing a procedure in both-element sticking diagnosis processing included in the sticking diagnosis processing according to the second embodiment. FIG. 9 is a flowchart showing a procedure in one-element sticking diagnosis processing included m the sticking diagnosis processing according to the second embodiment.

Referring to FIGS. 7 and 8, when DC charging of vehicle 1 is completed, ECU 100 outputs a command to close SMRs 21 and 22 to close SMRs 21 and 22 (S5B).

Then, ECU 100 performs both-element sticking diagnosis processing (S10B). Referring to FIG. 8, in both-element sticking diagnosis processing, ECU 100 outputs a command to open both of charge relays 71 and 72 (S305).

Then, ECU 100 transmits an output command to DC power feed facility 200 through communication apparatus 110 (S310). DC power feed facility 200 that has received the output command from vehicle 1 starts supply of electric power to vehicle 1 in accordance with the output command.

While electric power is being supplied from DC power feed facility 200, ECU 100 obtains current IB detected by current sensor 17 of monitoring unit 15 (S315) and compares current IB with a first threshold current Ith1 (S320).

First threshold current Ith1 is a threshold value for determining whether or not a current is input to power storage 10 while electric power is being supplied from DC power feed facility 200. First threshold current Ith1 is set, for example, to a value smaller than a lower limit of a charging current command value transmitted from vehicle 1 to DC power feed facility 200. Alternatively, first threshold current Ith1 may be set to a value around 0 A.

When current IB is higher than first threshold current Ith1 in S320, that is, when current sensor 17 detects a flow of a charging current to power storage 10 in spite of output of an open command to charge relays 71 and 72, it can be concluded that both of charge relays 71 and 72 have stuck in the closed state. Therefore, when current IB is higher than first threshold current Ith1 in S320 (YES in S320), ECU 100 determines that both of charge relays 71 and 72 have stuck in the closed state (both elements stuck) (S325).

When current IB is equal to or lower than first threshold current Ith1 in S320 (NO in S320), ECU 100 determines that both of charge relays 71 and 72 have not stuck in the closed state (both elements not stuck), that is, at least one of charge relays 71 and 72 is open in accordance with the open command (S330).

When ECU 100 determines that both of the elements have or have not stuck, it transmits a stop command to DC power feed facility 200 (S335) and quits both-element sticking diagnosis processing.

Referring to FIG. 7, when ECU 100 determines that both of charge relays 71 and 72 have stuck in the closed state (both elements stuck) in both-element sticking diagnosis processing (YES in S15), it quits the process.

When ECU 100 determines that both of charge relays 71 and 72 have not stuck in the closed state (both elements not stuck) in both-element sticking diagnosis processing (NO in S15), it performs one-element sticking diagnosis processing and diagnoses whether or not each of charge relays 71 and 72 has stuck (S20B).

Referring to FIG. 9, in one-element sticking diagnosis processing, ECU 100 initially diagnoses whether or not charge relay 72 has stuck. Specifically, ECU 100 outputs a command to close charge relay 71 and to open charge relay 72 (S405).

ECU 100 transmits an output command to DC power feed facility 200 through communication apparatus 110 (S410). DC power feed facility 200 that has received the output command from vehicle 1 starts supply of electric power to vehicle 1 in accordance with the output command.

ECU 100 obtains current IB detected by current sensor 17 (S415) and compares current IB with a second threshold current Ith2 (S420). Second threshold current Ith2 is a threshold value for determining whether or not a current is input to power storage 10 while electric power is being supplied from DC power feed facility 200. Second threshold current Ith2 is set, for example, to a value smaller than a lower limit of a charging current command value transmitted from vehicle 1 to DC power feed facility 200. Alternatively, second threshold current Ith2 may be set to a value around 0 A. Second threshold current Ith2 may be set, for example, to a value the same as first threshold current Ith1.

When charge relay 72 is open in accordance with the open command, it is expected that current IB detected by current sensor 17 attains to a value equal to or lower than second threshold current Ith2 in S420. When charge relay 72 has stuck in the closed state, both of charge relays 71 and 72 are closed and hence current IB in accordance with the charging current command value is input to power storage 10 while electric power is being supplied from DC power feed facility 200. Therefore, it is expected that current IB detected by current sensor 17 attains to a value higher than second threshold current Ith2.

When current IB is higher than second threshold current Ith2 (YES in S420), ECU 100 determines that charge relay 72 has stuck in the closed state (S425). Since both of charge relays 71 and 72 have not been determined as having stuck in the closed state in both-element sticking diagnosis processing in this case, it can be concluded that charge relay 71 is normally operating. Therefore, ECU 100 transmits a stop command to DC power feed facility 200 (S470) without diagnosing whether or not charge relay 71 has stuck and quits one-element sticking diagnosis processing.

When current IB is equal to or lower than second threshold current Ith2 (NO in S420), ECU 100 determines that charge relay 72 has not stuck in the closed state (S430). ECU 100 transmits a stop command to DC power feed facility 200 (S435). Then, ECU 100 diagnoses whether or not charge relay 71 has stuck.

ECU 100 outputs a command to open charge relay 71 and to close charge relay 72 (S440). Then, ECU 100 transmits an output command to DC power feed facility 200 through communication apparatus 110 (S445). DC power feed facility 200 that has received the output command from vehicle 1 starts supply of electric power to vehicle 1 in accordance with the output command.

ECU 100 obtains current IB detected by current sensor 17 (S450) and compares current IB with second threshold current Ith2 (S455). When charge relay 71 is open in accordance with the open command in this case, it is expected that current IB detected by current sensor 17 attains to a value equal to or lower than second threshold current Ith2. When charge relay 71 has stuck in the closed state, both of charge relays 71 and 72 are closed and hence current IB in accordance with the charging current command value is input to power storage 10 while electric power is being supplied from DC power feed facility 200. Therefore, it is expected that current IB detected by current sensor 17 attains to a value higher than second threshold current Ith2.

When current IB is higher than second threshold current Ith2 (YES in S455), ECU 100 determines that charge relay 71 has stuck in the closed state (S460).

When current IB is equal to or lower than second threshold current Ith2 (NO in S455), ECU 100 determines that charge relay 71 has not stuck in the closed state (S465). In this case, neither of charge relays 71 and 72 have stuck and charge relays 71 and 72 are determined as being normal.

When ECU 100 determines whether or not charge relay 71 has stuck in S460 or S465, it transmits a stop command to DC power feed facility 200 (S470) and quits one-element sticking diagnosis processing.

As in the first embodiment, the order of diagnosing charge relays 71 and 72 in one-element sticking diagnosis processing is not particularly limited either in the second embodiment. Though an example in which whether or not charge relay 72 has stuck is initially diagnosed and thereafter whether or not charge relay 71 has stuck is diagnosed is described above, whether or not charge relay 71 has stuck may be diagnosed and thereafter whether or not charge relay 72 has stuck may be diagnosed.

As set forth above, processing for diagnosing sticking of charge relays 71 and 72 performed by vehicle 1 according to the second embodiment is also performed while electric power is being supplied from DC power feed facility 200, as in sticking diagnosis processing in the first embodiment. In sticking diagnosis processing, vehicle 1 outputs an output command to DC power feed facility 200 and performs sticking diagnosis processing on the premise that electric power is being supplied from DC power feed facility 200. Therefore, even though DC power feed facility 200 falls under the specific DC power feed facility and electric power is unintentionally supplied from DC power feed facility 200 to vehicle 1 in sticking diagnosis processing, whether or not charge relay 71 and/or charge relay 72 have/has stuck can appropriately be diagnosed. By diagnosing whether or not charge relay 71 and/or charge relay 72 have/has stuck while electric power is being supplied from DC power feed facility 200 to vehicle 1, whether or not charge relay 71 and/or charge relay 72 have/has stuck can appropriately be diagnosed regardless of whether or not power feed facility 200 falls under the specific DC power feed facility.

The modification to the first embodiment can be applied also to the second embodiment. Sticking diagnosis processing in the second embodiment does not have to include both-element sticking diagnosis processing either. In this case, in one-element sticking diagnosis processing, regardless of a result of diagnosis of sticking of one charge relay (for example, charge relay 72), sticking of the other charge relay (for example, charge relay 71) is also diagnosed.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A vehicle comprising:
a power storage chargeable by receiving electric power supplied through a charge cable from a power feed facility outside the vehicle;
a first power line and a second power line;
a first relay electrically connected between a positive electrode of the power storage and the first power line;
a second relay electrically connected between a negative electrode of the power storage and the second power line;
a charge port to which a connector provided in the charge cable can be connected;
a first charge relay electrically connected between the first power line and the charge port;
a second charge relay electrically connected between the second power line and the charge port;
a communication apparatus that transmits a command to the power feed facility; and
a controller that performs sticking diagnosis processing for diagnosing whether the first charge relay and/or the second charge relay have/has stuck with the connector and the charge port being connected to each other, wherein
in the sticking diagnosis processing, the controller outputs an open or close command to each of the first charge relay and the second charge relay, transmits an output command requesting output of electric power to the power feed facility through the communication apparatus, and makes determination as to sticking of the first charge relay and/or the second charge relay based on whether electric power is being supplied from the power feed facility to the first power line and the second power line.

2. The vehicle according to claim 1, wherein
the sticking diagnosis processing is performed after charging of the power storage is completed.

3. The vehicle according to claim 1, further comprising a voltage sensor that detects a voltage between the first power line and the second power line, wherein
the controller performs the sticking diagnosis processing with the first relay and the second relay being open, and
in the sticking diagnosis processing, the controller outputs the open or close command to each of the first charge relay and the second charge relay and transmits the output command to the power feed facility through the communication apparatus, and makes determination as to sticking of the first charge relay and the second charge relay based on the voltage detected by the voltage sensor.

4. The vehicle according to claim 3, wherein
the sticking diagnosis processing includes both-element sticking diagnosis processing for diagnosing whether both of the first charge relay and the second charge relay have stuck, and
in the both-element sticking diagnosis processing, the controller outputs a command to open both of the first charge relay and the second charge relay and transmits the output command to the power feed facility through the communication apparatus, and when the voltage detected by the voltage sensor is higher than a first threshold voltage, the controller determines that both of the first charge relay and the second charge relay have stuck in a closed state.

5. The vehicle according to claim 4, wherein
when the voltage detected by the voltage sensor is lower than the first threshold voltage in the both-element sticking diagnosis processing, the controller determines that at least one of the first charge relay and the second charge relay has not stuck in the closed state.

6. The vehicle according to claim 3, wherein
the sticking diagnosis processing includes one-element sticking diagnosis processing for diagnosing whether one of the first charge relay and the second charge relay has stuck, and
in the one-element sticking diagnosis processing, the controller outputs a command to open the one of the first charge relay and the second charge relay and to close the other of the first charge relay and the second charge relay and transmits the output command to the power feed facility through the communication apparatus, and when the voltage detected by the voltage sensor is higher than a second threshold voltage, the controller determines that the one of the first charge relay and the second charge relay has stuck in a closed state.

7. The vehicle according to claim 1, further comprising a current sensor that detects a current input to and output from the power storage, wherein
the controller performs the sticking diagnosis processing with the first relay and the second relay being closed, and
in the sticking diagnosis processing, the controller outputs the open or close command to each of the first charge relay and the second charge relay and transmits the output command to the power feed facility through the communication apparatus, and makes determination as to sticking of the first charge relay and the second charge relay based on the current detected by the current sensor.

8. The vehicle according to claim 7, wherein
the sticking diagnosis processing includes both-element sticking diagnosis processing for diagnosing whether both of the first charge relay and the second charge relay have stuck, and
in the both-element sticking diagnosis processing, the controller outputs a command to open both of the first charge relay and the second charge relay and transmits the output command to the power feed facility through the communication apparatus, and when the current detected by the current sensor is higher than a first threshold current, the controller determines that both of the first charge relay and the second charge relay have stuck in a closed state.

9. The vehicle according to claim 8, wherein
when the current detected by the current sensor is lower than the first threshold current in the both-element sticking diagnosis processing, the controller determines that at least one of the first charge relay and the second charge relay has not stuck in the closed state.

10. The vehicle according to claim 7, wherein
the sticking diagnosis processing includes one-element sticking diagnosis processing for diagnosing whether one of the first charge relay and the second charge relay has stuck, and
in the one-element sticking diagnosis processing, the controller outputs a command to open the one of the first charge relay and the second charge relay and to close the other of the first charge relay and the second charge relay and transmits the output command to the power feed facility through the communication apparatus, and when the current detected by the current sensor is higher than a second threshold current, the controller determines that the one of the first charge relay and the second charge relay has stuck in a closed state.

11. A method of diagnosing sticking of a charge relay of a vehicle in which a power storage mounted on the vehicle is chargeable by receiving electric power supplied through a charge cable from a power feed facility outside the vehicle, the vehicle including a first power line, a second power line, a first relay electrically connected between a positive electrode of the power storage and the first power line, a second relay electrically connected between a negative electrode of the power storage and the second power line, a charge port to which a connector provided in the charge cable can be connected, a first charge relay electrically connected between the first power line and the charge port, a second charge relay electrically connected between the second power line and the charge port, and a communication apparatus that transmits a command to the power feed facility, the method, with the connector and the charge port being connected to each other, comprising:
outputting an open or close command to each of the first charge relay and the second charge relay;
transmitting an output command requesting output of electric power to the power feed facility through the communication apparatus; and
making determination as to sticking of the first charge relay and/or the second charge relay based on whether electric power is being supplied from the power feed facility to the first power line and the second power line.

* * * * *